(12) United States Patent
Kuang

(10) Patent No.: US 9,580,351 B2
(45) Date of Patent: Feb. 28, 2017

(54) OPTICAL GLASS FOR PRECISION MOLDING, PREFABRICATED GLASS, OPTICAL ELEMENT AND OPTICAL INSTRUMENT

(71) Applicant: CDGM GLASS CO., LTD., Chengdu, Sichuan (CN)

(72) Inventor: Bo Kuang, Sichuan (CN)

(73) Assignee: CDGM GLASS CO., LTD., Chengdu (CN)

( * ) Notice: Subject to any disclaimer, the term of this patent is extended or adjusted under 35 U.S.C. 154(b) by 0 days.

(21) Appl. No.: 14/430,395

(22) PCT Filed: Sep. 24, 2013

(86) PCT No.: PCT/CN2013/084064
§ 371 (c)(1),
(2) Date: Mar. 23, 2015

(87) PCT Pub. No.: WO2014/048295
PCT Pub. Date: Apr. 3, 2014

(65) Prior Publication Data
US 2015/0225282 A1  Aug. 13, 2015

(30) Foreign Application Priority Data
Sep. 29, 2012  (CN) .......................... 2012 1 0371400

(51) Int. Cl.
*C03C 3/064* (2006.01)
*C03C 3/068* (2006.01)

(52) U.S. Cl.
CPC .................................. *C03C 3/068* (2013.01)

(58) Field of Classification Search
CPC ......... C03C 3/062; C03C 3/064; C03C 3/066; C03C 3/068
USPC ........................................ 501/73, 77, 78, 79
See application file for complete search history.

(56) References Cited

U.S. PATENT DOCUMENTS

| 2005/0197243 A1* | 9/2005 | Hayashi | C03C 3/068 501/50 |
| 2005/0204776 A1* | 9/2005 | Hayashi | C03B 11/122 65/102 |
| 2006/0189473 A1* | 8/2006 | Endo | C03C 3/068 501/78 |
| 2007/0049483 A1* | 3/2007 | Hayashi | C03B 11/08 501/78 |
| 2010/0222199 A1* | 9/2010 | Wolff | C03C 3/068 501/78 |
| 2011/0028300 A1* | 2/2011 | Zou | C03B 17/062 501/78 |

FOREIGN PATENT DOCUMENTS

| CN | 1182058 C | 12/2004 | |
| CN | 1663923 A | 9/2005 | |
| CN | WO 2008046300 A1 * | 4/2008 | ............ C03C 3/068 |
| CN | 101948245 A | 1/2011 | |
| JP | 2009167075 A | 7/2009 | |

OTHER PUBLICATIONS

International Search Report for PCT/CN2013/084064, Jan. 2, 2014.

* cited by examiner

*Primary Examiner* — Noah Wiese
(74) *Attorney, Agent, or Firm* — Caesar Rivise, PC

(57) ABSTRACT

The invention provides a low-cost high-precision molding optical glass, with density below 4.54 g/cm$^3$, refractive index ranging from 1.85 to 1.95, Abbe number ranging from 25 to 35 and transition temperature lower than 610° C. Expensive $Ta_2O_5$ is not added in the invention, so the production cost is saved, and resource saving is realized; the combination of $B_2O_3$ and $La_2O_3$ effectively improves the devitrification resistance and the chemical stability of glass; the combination of $WO_3$ and $TiO_2$ allows the staining degree of the optical glass to be excellent; and the combination of $Gd_2O_3$ and $La_2O_3$ effectively improves the devitrification resistance of the glass.

30 Claims, No Drawings

OPTICAL GLASS FOR PRECISION MOLDING, PREFABRICATED GLASS, OPTICAL ELEMENT AND OPTICAL INSTRUMENT

TECHNICAL FIELD

The invention relates to an optical glass, in particular to a high-precision molding optical glass with refractive index ranging from 1.85 to 1.95 and Abbe number ranging from 25 to 35, as well as to the preform, optical element and optical apparatus made of said optical glass.

BACKGROUND ART

In recent years, with the popularization of digital cameras and camcorders, people demand more and more glass lens for major components. In addition, due to pixel increase of imaging device in the digital camera, optical elements like glass lens require higher performance. Since aspheric element could better eliminate the spherical aberration and reduce the number of optical elements, aspheric element hits the mainstream in optical design.

High-precision molding, a commonly used method for aspheric molding, refers to press molding of glass perform under high temperature by mould for female die with predetermined shape, in order to obtain the final shape or glass molded article with shape similar to the final shape. Molded products with desired shape may be efficiently produced by high-precision molding. Besides, the aspheric lenses manufactured with high-precision molding technology usually no longer require grinding and polishing, thereby reducing costs and improving productivity. In order to replicate the high-precision modular surface on the glass moldings during high-precision molding, the glass preform is required to be pressurized under high temperature. At this point, shaping mould is exposed under high temperature with higher pressure. The surface layer of compression mold remains vulnerable to oxidative attack even under protection. If expensive high-precision mould is frequently changed during high-precision molding, low cost and high productivity will not be achieved. To prolong the service life of mould and reduce damage to the shaping mould by high-temperature environment, molding temperature shall be reduced as much as possible. Therefore, optical material developer aims to develop optical glass with transition temperature (Tg) as low as possible.

Cost saving not only can realized by prolonging the service life of shaping mould, but also by reducing raw material costs. CN1182058C discloses a high-refractivity optical glass, in which a large amount of high-cost $Ta_2O_5$ is applied, so it is not suitable for large-volume industrial production.

CONTENTS OF THE INVENTION

A technical problem to be solved by the invention is to provide a low-cost high-precision molding optical glass, with density ($\rho$) below 4.54 g/cm$^3$, refractive index (nd) ranging from 1.85 to 1.95, Abbe number (vd) ranging from 25 to 35 and transition temperature (Tg) lower than 610° C.

To solve the technical problem, the invention provides the high-precision molding optical glass without $Ta_2O_5$, with density below 4.54 g/cm$^3$, refractive index ranging from 1.85 to 1.95, Abbe number ranging from 25 to 35 and transition temperature lower than 610° C.

Furthermore, components of the optical glass by weight percentage are as follows: 2 to 10% of $SiO_2$, 12 to 22% of $B_2O_3$, 25 to 40% of $La_2O_3$, 1 to 10% of $ZrO_2$, 5 to 12% of ZnO, 5 to 15% of $TiO_2$, 0 to 5% of $GeO_2$, 3 to 15% of $Gd_2O_3$, 5 to 15% of $Nb_2O_5$, 1 to 8% of $WO_3$ and 0.1 to 1% of $Li_2O$.

Furthermore, $SiO_2$ accounts for 3 to 8%.
Furthermore, $B_2O_3$ accounts for 15 to 20% and $La_2O_3$ accounts for 30 to 40%.
Furthermore, ZnO accounts for 5 to 10%.
Furthermore, $TiO_2$ accounts for 6 to 12% and $WO_3$ accounts for 1 to 5%.
Furthermore, the content of $TiO_2$ is greater than 8% but less than or equal to 12%.
Furthermore, $Gd_2O_3$ accounts for 5 to 10% and $La_2O_3$ accounts for 30 to 40%.
Furthermore, the content of $Gd_2O_3$ is greater than 5% but less than or equal to 10%.
Furthermore, the total content of $Gd_2O_3$ and $La_2O_3$ is 36 to 45%.
Furthermore, $ZrO_2$ accounts for 3 to 8%, $GeO_2$ accounts for 0 to 2%, $Nb_2O_5$ accounts for 8 to 14% and $Li_2O$ accounts for 0.5 to 1%.
Furthermore, the total content of $SiO_2$, $B_2O_3$, $La_2O_3$, $ZrO_2$, ZnO, $TiO_2$, $Gd_2O_3$, $Nb_2O_5$, $WO_3$ and $Li_2O$ is greater than 95%.
Furthermore, the total content of $SiO_2$, $B_2O_3$, $La_2O_3$, $ZrO_2$, ZnO, $TiO_2$, $Gd_2O_3$, $Nb_2O_5$ and $Li_2O$ is greater than 93%.

The components of high-precision molding optical glass by weight percentage are as follows: 2 to 10% of $SiO_2$, 12 to 22% of $B_2O_3$, 25 to 40% of $La_2O_3$, 1 to 10% of $ZrO_2$, 5 to 12% of ZnO, 5 to 15% of $TiO_2$, 0 to 5% of $GeO_2$, 3 to 15% of $Gd_2O_3$, 5 to 15% of $Nb_2O_5$, 1 to 8% of $WO_3$ and 0.1 to 1% of $Li_2O$.

Furthermore, $SiO_2$ accounts for 3 to 8%.
Furthermore, $B_2O_3$ accounts for 15 to 20% and $La_2O_3$ accounts for 30 to 40%.
Furthermore, $ZrO_2$ accounts for 3 to 8%.
Furthermore, ZnO accounts for 5 to 10%.
Furthermore, $TiO_2$ accounts for 6 to 12% and $WO_3$ accounts for 1 to 5%.
Furthermore, the content of $TiO_2$ is greater than 8% but less than or equal to 12%.
Furthermore, $GeO_2$ accounts for 0 to 2%.
Furthermore, $Gd_2O_3$ accounts for 5 to 10% and $La_2O_3$ accounts for 30 to 40%.
Furthermore, the content of $Gd_2O_3$ is greater than 5% but less than or equal to 10%.
Furthermore, the total content of $Gd_2O_3$ and $La_2O_3$ is 36 to 45%.
Furthermore, $Nb_2O_5$ accounts for 8 to 14%.
Furthermore, $Li_2O$ accounts for 0.5 to 1%.
Furthermore, the total content of $SiO_2$, $B_2O_3$, $La_2O_3$, $ZrO_2$, ZnO, $TiO_2$, $Gd_2O_3$, $Nb_2O_5$, $WO_3$ and $Li_2O$ is greater than 95%.
Furthermore, the total content of $SiO_2$, $B_2O_3$, $La_2O_3$, $ZrO_2$, ZnO, $TiO_2$, $Gd_2O_3$, $Nb_2O_5$ and $Li_2O$ is greater than 93%.

A glass preform made of the above-mentioned high-precision molding optical glass.
An optical element made of the above-mentioned high-precision molding optical glass.
An optical apparatus made of the above-mentioned high-precision molding optical glass.

The optical glass provided by the invention is advantageous in that expensive $Ta_2O_5$ is not added, which reduces production costs and saves resources; the devitrification resistance of glass may be effectively improved and chemical stability be strengthened through the combination of $B_2O_3$ and $La_2O_3$; excellent staining degree is achieved by the combination of $WO_3$ and $TiO_2$; the devitrification resistance of glass may be effectively improved by the combination of $Gd_2O_3$ and $La_2O_3$ as well, and a high-precision molding optical glass with refractive index ranging from 1.85 to 1.95, Abbe number ranging from 25 to 35, glass transition temperature lower than 610° C. and density below 4.54 g/cm$^3$ can be obtained.

DESCRIPTION OF EMBODIMENTS

Each component of the optical glass provided by the invention is described hereunder, and the content thereof is represented by wt % unless otherwise stated.

$SiO_2$ is an oxide forming glass network, and adding a certain amount of $SiO_2$ can increase the high temperature viscosity and improve the devitrification resistance of glass. When the content of $SiO_2$ is lower than 2%, the effects are not obvious; while when the content exceeds 10%, the melting behavior of glass is liable to be poor and it is hard to remove the bubbles. Therefore, the content of $SiO_2$ is 2 to 10%, preferably 3 to 8%.

$B_2O_3$ is also an oxide forming glass network, and an essential component to improve the melting behavior to reduce the viscosity of glass. It can be used as solvent in the glass melting process. When the content of $B_2O_3$ is less than 12%, it is difficult to obtain stable glass and the devitrification resistance is unsatisfactory; but when the content of $B_2O_3$ is higher than 22%, the refractive index of glass cannot reach the design goal and the chemical stability of glass will be reduced. Therefore, the content of $B_2O_3$ is 12 to 22%, preferably 15 to 20%.

$La_2O_3$, as a main component of high-refractivity optical glass, can increase the refractive index of glass and not obviously increase the dispersion of glass. In the formulation provided in the invention, the combination of $B_2O_3$ and $La_2O_3$ may effectively improve the devitrification resistance and strengthen the chemical stability of glass. However, when the content of $La_2O_3$ is less than 25%, such effect cannot be achieved; while when the content exceeds 40%, the devitrification resistance of glass is liable to be poor. Therefore, the content of $La_2O_3$ is 25 to 40%, preferably 30 to 40%.

$ZrO_2$ can improve the viscosity, hardness and chemical stability of glass and lower the coefficient of thermal expansion of glass. When the content of $ZrO_2$ exceeds 10%, the glass is liable to be refractory and prone to devitrification, and the chemical stability of glass becomes poor. Therefore, the content of $ZrO_2$ is preferably 1 to 10%, more preferably 3 to 8%.

ZnO, as an essential component of high-precision molding optical glass provided by the invention, could help lower the melting temperature and transition temperature of glass, and adjust the optical properties of glass. When the content of ZnO is less than 5%, the transition temperature of glass will increase; while when the content is higher than 12%, devitrification tends to increase and high-temperature viscosity of the glass decreases, bringing great difficulties in glass molding. Therefore, the content of ZnO is preferably 5 to 12%, more preferably 5 to 10%.

$WO_3$ can adjust the optical constant and devitrification resistance of glass. Especially in lanthanide optical glass, $WO_3$ can effectively improve the devitrification resistance of glass and transmittance will not be damaged too much. Experiments show that when the content of $WO_3$ exceeds 8%, the devitrification resistance of glass is liable to be degraded, so the content of $WO_3$ is preferably 1 to 8%, more preferably 1 to 5%.

$TiO_2$ enables the glass to enjoy high refractivity, but over-high content will greatly reduce the dispersion coefficient and devitrification tends to increase, or even significantly increase the staining degree. Through researches, the inventor found that excellent staining degree is achieved by the combination of $WO_3$ and $TiO_2$ in the present invention. Therefore, the content of $TiO_2$ is preferably 5 to 15%, more preferably 6 to 12%, and most preferably greater than 8% but less than or equal to 12%.

$GeO_2$ can enhance the refractive index and thermal stability of glass, but if the content thereof is greater than 5%, the thermal stability of glass is liable to be degraded. Thus, the content of $GeO_2$ is preferably 0 to 5%, more preferably 0 to 2%.

$Gd_2O_3$ can increase the refractive index and thermal stability of glass. If certain amount of $Gd_2O_3$ is molten together with $La_2O_3$, the devitrification resistance of glass may be effectively improved. When the content of $Gd_2O_3$ is less than 3%, the effects are not obvious; while when the content of $Gd_2O_3$ exceeds 15%, the devitrification resistance of glass is liable to be poor. Therefore, the content of $Gd_2O_3$ is 3 to 15%, more preferably 5 to 10%, most preferably greater than 5% but less than or equal to 10%.

When the total content of $Gd_2O_3$ and $La_2O_3$ is 36 to 45%, the devitrification resistance of glass may be more effectively improved, thus realizing the optical performance required by the invention.

$Nb_2O_5$ can increase the refractive index and improve the chemical durability and devitrification resistance. When the content of $Nb_2O_5$ is less than 5%, the effects are not obvious; while when the content of $Nb_2O_5$ exceeds 15%, the devitrification resistance is liable to be poor and the softening temperature of glass goes up, so the content of $Nb_2O_5$ is preferably 5 to 15%, more preferably 8 to 14%.

$Li_2O$ can significantly reduce the transition temperature of glass and effectively improve the melting behavior of glass, but when its content exceeds 1%, the devitrification resistance and chemical stability of glass is liable to be poor. Therefore, the content of $Li_2O$ is 0.1 to 1%, preferably 0.5 to 1%.

On the premise of ensuring the optical glass provided by the invention enjoy the refractive index ranging from 1.85 to 1.95 and Abbe number ranging from 25 to 35, in order to more effectively improve the devitrification resistance and chemical stability of glass, the total content of $SiO_2$, $B_2O_3$, $La_2O_3$, $ZrO_2$, ZnO, $TiO_2$, $Gd_2O_3$, $Nb_2O_5$, $WO_3$ and $Li_2O$ applied in the present invention is greater than 95%, more preferably, the total content of $SiO_2$, $B_2O_3$, $La_2O_3$, $ZrO_2$, ZnO, $TiO_2$, $Gd_2O_3$, $Nb_2O_5$ and $Li_2O$ is greater than 93%.

In the following paragraphs, the performance of high-precision molding optical glass provided in the present invention will be described:

Refractive index (nd) refers to annealing value from −2° C./h to −6° C./h. The refractive index and Abbe number are measured as per the *Test Methods of Colorless Optical Glass—Refractive Index and Coefficient of Dispersion* (GB/T 7962.1-1987).

Transition temperature (Tg) is tested as per *Test Methods of Colorless Optical Glass—Linear Thermal Expansion Coefficient, Transition Temperature and Yield Point Temperature* (GB/T 7962.16-1987), namely, placing the tested sample in a certain temperature range, extending straight lines of a low-temperature region and a high-temperature region on an expansion curve of the tested sample for each 1 degree centigrade rise in temperature, intersecting the straight lines, wherein the temperature corresponding to the intersection point is the Tg.

The density is tested as per *Colorless Optical Glass Test Methods—Density* (GB/T 7962.20-1987).

The glass is processed into a sample which is 10 mm plus or minus 0.1 mm thick, and then the wavelength $\lambda_{70}$ corresponding to the transmissivity of 70% is tested.

The test shows that the optical glass provided by the invention has the following properties that the density is below 4.54 g/cm$^3$, refractive index (nd) ranges from 1.85 to 1.95, Abbe number (vd) ranges from 25 to 35, transition temperature (Tg) is lower than 610° C. and the wavelength $\lambda_{70}$ corresponding to the transmissivity of 70% is less than 430 nm.

The invention also provides an optical element made of said optical glass with the method that is well known by technical personnel in the art. Since the optical glass enjoys high refractive index and low glass Tg, the optical element also enjoys high refractive index and low glass Tg and is applicable to digital cameras, digital video cameras and camera phones, etc.

To further understand the technical scheme of the present invention, embodiments of optical glass provided in the invention are described as below. What shall be noted is that these embodiments do not limit the scope of this invention.

The optical glasses (embodiments 1~30) shown in Tables 1 to 3 are formed by weighting based on the proportions of each embodiment in Tables 1 to 3, mixing the ordinary raw materials for optical glass (such as oxide, hydroxide, carbonate and nitrate), placing the mixed raw materials in a platinum crucible, melting under the temperature of 1100 to 1300° C., obtaining homogeneous molten glass without bubbles and undissolved substances after melting, clarification, stirring and homogenization, shaping the molten glass in a mould and perform annealing.

Tables 1 to 3 show the composition of embodiments 1~30 of the invention and refractive index (nd), Abbe number (vd), density (ρ), glass transition temperature (Tg) and wavelength $\lambda_{70}$ corresponding to the transmissivity of 70%. The composition of each component is represented by wt % in such tables.

TABLE 1

| Composition | Embodiments | | | | | | | | | |
|---|---|---|---|---|---|---|---|---|---|---|
| | 1 | 2 | 3 | 4 | 5 | 6 | 7 | 8 | 9 | 10 |
| SiO$_2$ | 2.05 | 9.87 | 3.03 | 5.89 | 5.21 | 4.85 | 5.33 | 6.18 | 7.34 | 3.52 |
| B$_2$O$_3$ | 21.84 | 12.12 | 19.88 | 15.1 | 16.21 | 18.68 | 16.44 | 18.22 | 17.24 | 16.1 |
| La$_2$O$_3$ | 25.03 | 35.39 | 30.05 | 39.78 | 28.02 | 38.58 | 35.2 | 34.32 | 32.33 | 37.15 |
| ZrO$_2$ | 9.90 | 1.11 | 7.76 | 3.04 | 4.36 | 4.56 | 6.57 | 5.24 | 4.55 | 6.22 |
| ZnO | 8.20 | 11.87 | 5.03 | 5.64 | 9.85 | 6.32 | 7.64 | 8.22 | 6.39 | 6.38 |
| TiO$_2$ | 5.03 | 14.92 | 8.88 | 8.04 | 11.89 | 7.65 | 8.34 | 7.65 | 6.35 | 10.25 |
| GeO$_2$ | 0 | 4.86 | 1.89 | 0.68 | 0.89 | 1.05 | 1.52 | 0.86 | 1.25 | 0.52 |
| Gd$_2$O$_3$ | 14.91 | 3.01 | 9.96 | 5.01 | 8.32 | 6.13 | 6.68 | 7.65 | 8.47 | 6.35 |
| Nb$_2$O$_5$ | 5.1 | 4.86 | 8.12 | 13.92 | 10.2 | 9.22 | 8.46 | 8.69 | 12.68 | 9.14 |
| WO$_3$ | 6.94 | 1.04 | 4.89 | 2.3 | 4.31 | 2.14 | 3.11 | 2.34 | 2.57 | 3.65 |
| Li$_2$O | 1.00 | 0.95 | 0.51 | 0.6 | 0.74 | 0.82 | 0.71 | 0.63 | 0.83 | 0.72 |
| nd | 1.86 | 1.87 | 1.90 | 1.95 | 1.86 | 1.93 | 1.92 | 1.89 | 1.88 | 1.91 |
| vd | 35.0 | 30.5 | 30.2 | 27.6 | 32.6 | 29.4 | 30.5 | 29.5 | 33.7 | 29.6 |
| Tg (° C.) | 597 | 586 | 609 | 602 | 601 | 592 | 593 | 596 | 602 | 604 |
| ρ (g/cm$^3$) | 4.23 | 4.46 | 4.48 | 4.53 | 4.31 | 4.52 | 4.50 | 4.35 | 4.47 | 4.48 |
| $\lambda_{70}$ (nm) | 388 | 409 | 417 | 428 | 407 | 420 | 417 | 408 | 395 | 417 |

TABLE 2

| Composition | Embodiments | | | | | | | | | |
|---|---|---|---|---|---|---|---|---|---|---|
| | 11 | 12 | 13 | 14 | 15 | 16 | 17 | 18 | 19 | 20 |
| SiO$_2$ | 3.91 | 7.3 | 5.68 | 6.3 | 6.62 | 5.1 | 4.84 | 7.21 | 4.5 | 6.2 |
| B$_2$O$_3$ | 20.34 | 16.1 | 15.3 | 17.2 | 17.4 | 14.2 | 18.2 | 17.68 | 14.28 | 15.3 |
| La$_2$O$_3$ | 26.43 | 28.3 | 33.83 | 35.03 | 29.47 | 36.69 | 33.2 | 32.81 | 37.2 | 34.6 |
| ZrO$_2$ | 8.08 | 9.3 | 7.92 | 5.11 | 6.45 | 5.4 | 8.11 | 7.33 | 5.74 | 6.04 |
| ZnO | 7.44 | 10 | 6.14 | 6.18 | 8.68 | 7.5 | 7.35 | 8.16 | 7.33 | 6.45 |
| TiO$_2$ | 5.63 | 9.4 | 10.1 | 7.33 | 9.2 | 8.1 | 7.36 | 8.63 | 7.39 | 11.2 |
| GeO$_2$ | 0.58 | 3.24 | 0.63 | 1.2 | 0.91 | 1.3 | 0.99 | 0.82 | 0.94 | 0.84 |
| Gd$_2$O$_3$ | 13.1 | 4.21 | 8.39 | 6.58 | 7.33 | 6.44 | 7.34 | 6.43 | 7.36 | 6.15 |
| Nb$_2$O$_5$ | 6.3 | 8.95 | 7.46 | 11.24 | 9.1 | 10.1 | 7.56 | 6.85 | 10.5 | 9.07 |
| WO$_3$ | 7.64 | 2.68 | 3.88 | 3.25 | 4.3 | 4.5 | 4.33 | 3.24 | 4.02 | 3.52 |
| Li$_2$O | 0.55 | 0.52 | 0.67 | 0.58 | 0.54 | 0.67 | 0.72 | 0.84 | 0.74 | 0.63 |
| nd | 1.89 | 1.88 | 1.91 | 1.91 | 1.90 | 1.94 | 1.91 | 1.88 | 1.93 | 1.92 |
| vd | 33.8 | 30.1 | 29.2 | 30.4 | 30.9 | 29.8 | 32.5 | 30.4 | 29.8 | 29.6 |
| Tg (° C.) | 608 | 597 | 601 | 603 | 599 | 602 | 600 | 589 | 592 | 602 |
| ρ (g/cm$^3$) | 4.42 | 4.40 | 4.47 | 4.49 | 4.48 | 4.54 | 4.50 | 4.42 | 4.51 | 4.50 |
| $\lambda_{70}$ (nm) | 398 | 407 | 419 | 422 | 419 | 427 | 412 | 405 | 424 | 421 |

TABLE 3

| Composition | \multicolumn{10}{c}{Embodiments} | | | | | | | | | |
|---|---|---|---|---|---|---|---|---|---|---|
| | 21 | 22 | 23 | 24 | 25 | 26 | 27 | 28 | 29 | 30 |
| $SiO_2$ | 5.3 | 5.1 | 5.22 | 5.89 | 4.61 | 4.45 | 5.14 | 4.85 | 4.06 | 4.8 |
| $B_2O_3$ | 17.6 | 16.8 | 17 | 16.9 | 17.2 | 17.36 | 16.78 | 17.1 | 16.85 | 17.2 |
| $La_2O_3$ | 33.41 | 34.98 | 34.15 | 34.46 | 35.21 | 34.2 | 34.51 | 35.45 | 34.16 | 34.31 |
| $ZrO_2$ | 5.34 | 5.3 | 4.96 | 5.1 | 5.2 | 5.01 | 5.33 | 4.68 | 5.11 | 5.01 |
| ZnO | 7.64 | 7.2 | 6.58 | 6.87 | 7.11 | 7.33 | 6.84 | 7.38 | 7.61 | 7.38 |
| $TiO_2$ | 8.33 | 8.31 | 9.1 | 8.34 | 9.14 | 8.69 | 9.15 | 8.42 | 8.78 | 8.56 |
| $GeO_2$ | 1.01 | 0.96 | 0.86 | 1.2 | 0.89 | 1.02 | 0.91 | 1.36 | 1.05 | 0.82 |
| $Gd_2O_3$ | 7.3 | 7.01 | 6.85 | 6.12 | 6.69 | 7.82 | 7.33 | 6.85 | 7.46 | 8.1 |
| $Nb_2O_5$ | 10.3 | 10.67 | 11.4 | 11.52 | 10.12 | 10.5 | 10.45 | 10.58 | 10.58 | 10.65 |
| $WO_3$ | 3.12 | 2.96 | 3.2 | 2.94 | 3.1 | 2.96 | 2.84 | 2.64 | 3.15 | 2.38 |
| $Li_2O$ | 0.65 | 0.71 | 0.68 | 0.66 | 0.73 | 0.66 | 0.72 | 0.69 | 0.67 | 0.79 |
| nd | 1.91 | 1.92 | 1.90 | 1.89 | 1.90 | 1.91 | 1.90 | 1.91 | 1.92 | 1.90 |
| vd | 29.8 | 29.9 | 30.3 | 31.2 | 30.6 | 30.9 | 30.6 | 31.1 | 30.4 | 30.3 |
| Tg (° C.) | 601 | 593 | 602 | 598 | 596 | 604 | 595 | 603 | 602 | 590 |
| ρ (g/cm$^3$) | 4.53 | 4.52 | 4.51 | 4.48 | 4.51 | 4.51 | 4.49 | 4.50 | 4.52 | 4.50 |
| $\lambda_{70}$ (nm) | 419 | 425 | 416 | 407 | 418 | 418 | 419 | 417 | 426 | 417 |

As illustrated in the above embodiments, the optical glass provided by the invention is characterized by density (ρ) below 4.54 g/cm$^3$, refractive index (nd) ranging from 1.85 to 1.95, Abbe number (vd) ranging from 25 to 35, transition temperature (Tg) lower than 610° C. and wavelength $\lambda_{70}$ corresponding to the transmissivity of 70% below 430 nm, and is applicable to high-precision molding.

The invention claimed is:

1. A high-precision molding optical glass, not comprising $Ta_2O_5$, with density below 4.54 g/cm3, refractive index ranging from 1.87 to 1.95, Abbe number ranging from 25 to 35 and transition temperature lower than 610° C., comprising 12 to 22% of $B_2O_3$, 25 to 40% of $La_2O_3$, 5 to 12% of ZnO, 5 to 15% of $TiO_2$, 5 to 15% of $Nb_2O_5$, 1 to 10% of $ZrO_2$, 0 to 5% of GeO, 2 to 10% of $SiO_2$, 3 to 15% of $Gd_2O_3$, 1 to 8% of $WO_3$ and 0.1 to 1% of $Li_2O$.

2. The high-precision molding optical glass according to claim 1, wherein $SiO_2$ accounts for 3 to 8%.

3. The high-precision molding optical glass according to claim 1, wherein $B_2O_3$ accounts for 15 to 20% and $La_2O_3$ accounts for 30 to 40%.

4. The high-precision molding optical glass according to claim 1, wherein ZnO accounts for 5 to 10%.

5. The high-precision molding optical glass according to claim 1, wherein $TiO_2$ accounts for 6 to 12% and $WO_3$ accounts for 1 to 5%.

6. The high-precision molding optical glass according to claim 1, wherein the content of $TiO_2$ is greater than 8% but less than or equal to 12%.

7. The high-precision molding optical glass according to claim 1, wherein $Gd_2O_3$ accounts for 5 to 10% and $La_2O_3$ accounts for 30 to 40%.

8. The high-precision molding optical glass according to claim 1, wherein the content of $Gd_2O_3$ is greater than 5% but less than or equal to 10%.

9. The high-precision molding optical glass according to claim 1, wherein the total content of $Gd_2O_3$ and $La_2O_3$ is 36 to 45%.

10. The high-precision molding optical glass according to claim 1, wherein $ZrO_2$ accounts for 3 to 8%, $GeO_2$ accounts for 0 to 2%, $Nb_2O_5$ accounts for 8 to 14% and $Li_2O$ accounts for 0.5 to 1%.

11. The high-precision molding optical glass according to claim 1, wherein the total content of $SiO_2$, $B_2O_3$, $La_2O_3$, $ZrO_2$, ZnO, $TiO_2$, $Gd_2O_3$, $Nb_2O_5$, $WO_3$ and $Li_2O$ is greater than 95%.

12. The high-precision molding optical glass according to claim 1, wherein the total content of $SiO_2$, $B_2O_3$, $La_2O_3$, $ZrO_2$, ZnO, $TiO_2$, $Gd_2O_3$, $Nb_2O_5$ and $Li_2O$ is greater than 93%.

13. A high-precision molding optical glass, comprising by weight percentage as follows: 2 to 10% of $SiO_2$, 12 to 22% of $B_2O_3$, 25 to 40% of $La_2O_3$, 1 to 10% of $ZrO_2$, 5 to 12% of ZnO, 5 to 15% of $TiO_2$, 0 to 5% of $GeO_2$, 3 to 15% of $Gd_2O_3$, 5 to 15% of $Nb_2O_5$, 1 to 8% of $WO_3$ and 0.1 to 1% of $Li_2O$, and having a refractive index ranging from 1.87to 1.95.

14. The high-precision molding optical glass according to claim 13, wherein $SiO_2$ accounts for 3 to 8%.

15. The high-precision molding optical glass according to claim 13, wherein $B_2O_3$ accounts for 15 to 20% and $La_2O_3$ accounts for 30 to 40%.

16. The high-precision molding optical glass according to claim 13, wherein $ZrO_2$ accounts for 3 to 8%.

17. The high-precision molding optical glass according to claim 13, wherein ZnO accounts for 5 to 10%.

18. The high-precision molding optical glass according to claim 13, wherein $TiO_2$ accounts for 6 to 12% and $WO_3$ accounts for 1 to 5%.

19. The high-precision molding optical glass according to claim 13, wherein the content of $TiO_2$ is greater than 8% but less than or equal to 12%.

20. The high-precision molding optical glass according to claim 13, wherein $GeO_2$ accounts for 0 to 2%.

21. The high-precision molding optical glass according to claim 13, wherein $Gd_2O_3$ accounts for 5 to 10% and $La_2O_3$ accounts for 30 to 40%.

22. The high-precision molding optical glass according to claim 13, wherein the content of $Gd_2O_3$ is greater than 5% but less than or equal to 10%.

23. The high-precision molding optical glass according to claim 13, wherein the total content of $Gd_2O_3$ and $La_2O_3$ is 36 to 45%.

24. The high-precision molding optical glass according to claim 13, wherein $Nb_2O_5$ accounts for 8 to 14%.

25. The high-precision molding optical glass according to claim 13, wherein $Li_2O$ accounts for 0.5 to 1%.

26. The high-precision molding optical glass according to claim 13, wherein the total content of $SiO_2$, $B_2O_3$, $La_2O_3$, $ZrO_2$, ZnO, $TiO_2$, $Gd_2O_3$, $Nb_2O_5$, $WO_3$ and $Li_2O$ is greater than 95%.

27. The high-precision molding optical glass according to claim 13, wherein the total content of $SiO_2$, $B_2O_3$, $La_2O_3$, $ZrO_2$, ZnO, $TiO_2$, $Gd_2O_3$, $Nb_2O_5$ and $Li_2O$ is greater than 93%.

28. A glass preform made of said high-precision molding optical glass according to claim 1.

29. An optical element made of said high-precision molding optical glass according to claim 1.

30. An optical apparatus made of said high-precision molding optical glass according to claim 1.

* * * * *